G. E. LOUBIÈRE.
ELECTRIC HEATER FOR WATER AND OTHER LIQUIDS.
APPLICATION FILED DEC. 21, 1921.
1,438,445.
Patented Dec. 12, 1922.
2 SHEETS—SHEET 2.
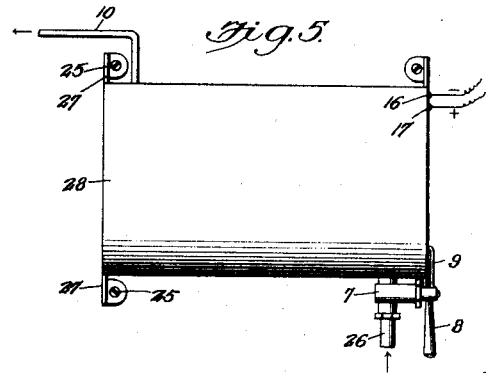
Fig. 5.
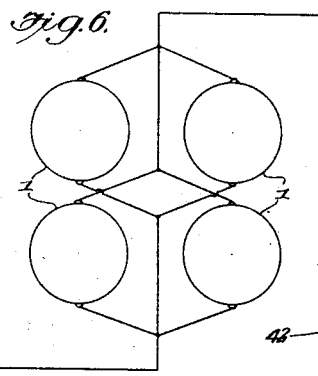
Fig. 6.
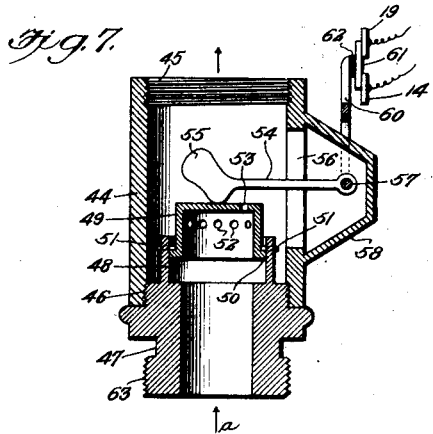
Fig. 7.
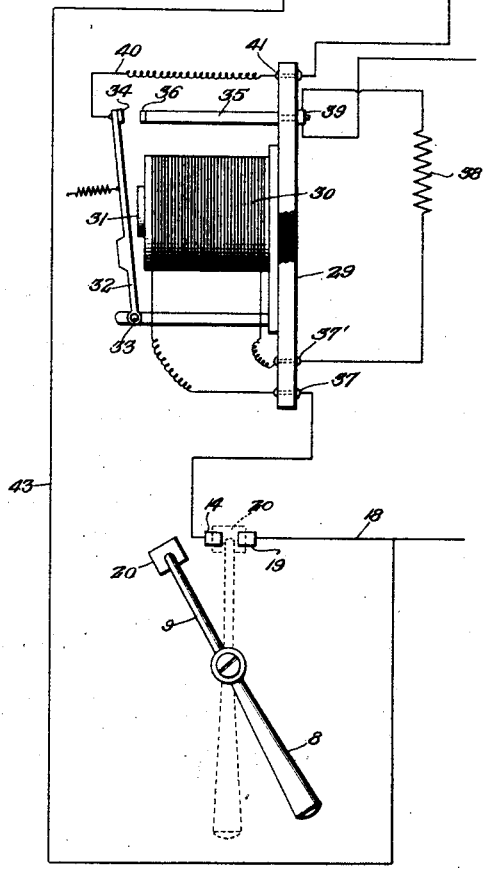
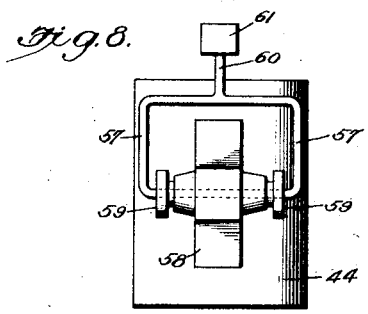
Fig. 8.
Inventor
German Elias Loubière,
By
Attorney Patented Dec. 12, 1922.

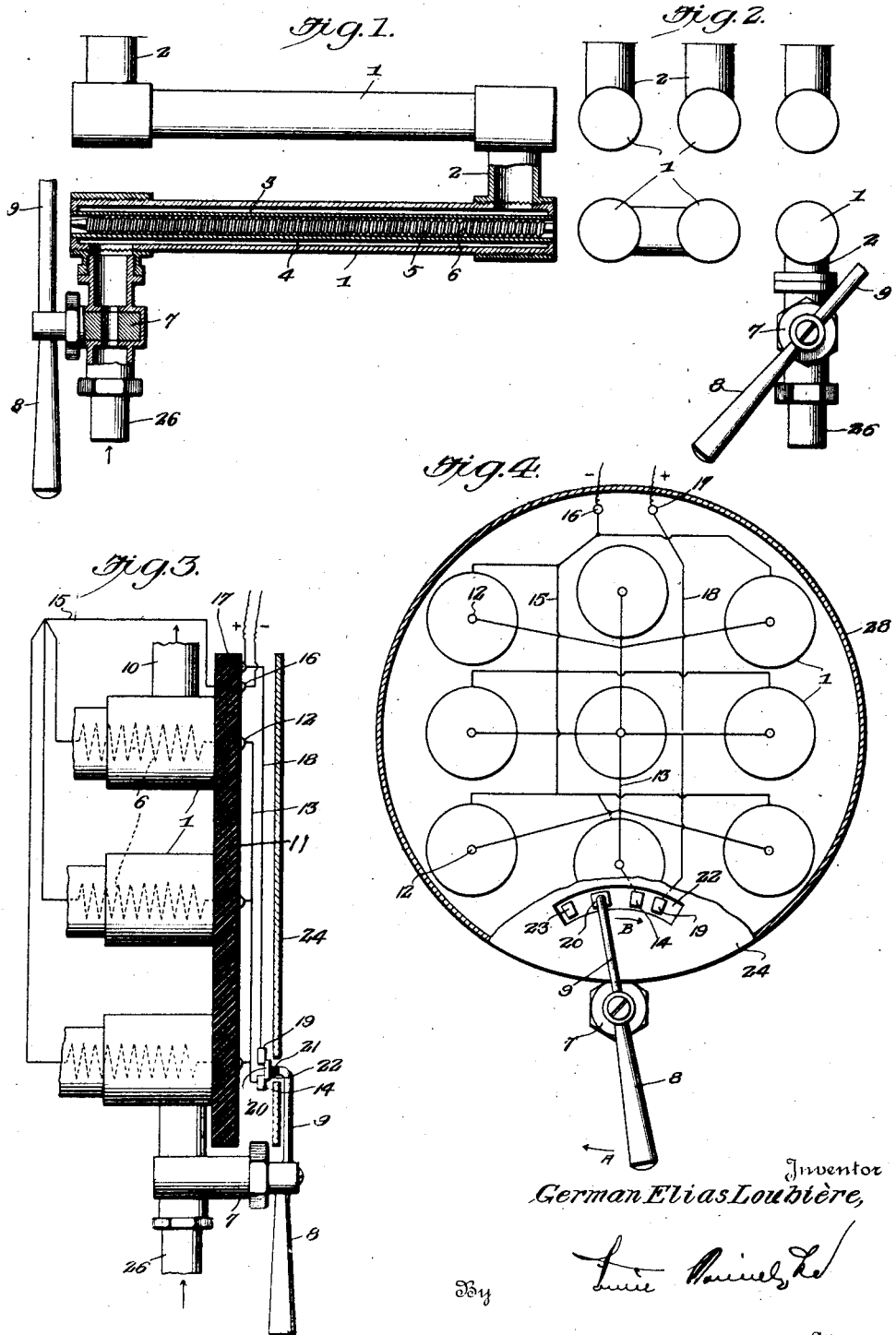

1,438,445

UNITED STATES PATENT OFFICE.

GERMAN ELIAS LOUBIÈRE, OF BUENOS AIRES, ARGENTINA.

ELECTRIC HEATER FOR WATER AND OTHER LIQUIDS.

Application filed December 21, 1921. Serial No. 523,959.

*To all whom it may concern:*

Be it known that I, GERMAN ELIAS LOUBIÈRE, citizen of the Republic of France, residing at 1376 Sarmiento Street, Buenos Aires, Argentina, have invented certain new and useful Improvements in Electric Heaters for Water and Other Liquids, of which the following is a specification.

This invention relates to certain improvements in electric heaters for water and like substances, its main object being to provide an electric heater of a very simple construction, quick and easy working, and reduced cost, and which possesses great advantages over those known in the art.

In order that my present invention may be clearly understood and easily carried into practice I have shown preferred embodiments of the same in the annexed drawings wherein,—

Fig. 1 is a fragmental view of the disposition and form of the tubes, one of them appearing in section.

Fig. 2 shows in front view the arrangement of the tubes within the apparatus.

Fig. 3 is a cross sectional view of the front part of the apparatus showing the internal structure of the same.

Fig. 4 is a front view corresponding to Fig. 3.

Fig. 5 is an external view of the apparatus ready for use.

Fig. 6 shows an alternative form of operating handle, with a relay in the circuit of the electric heater.

Fig. 7 illustrates a system including an automatic switch which is represented at the moment when it is actuated by the pressure of the incoming water.

Fig. 8 is a side elevation of the said switch.

Similar characters of reference refer to the same or like parts throughout the said drawings.

Reference will be made now to the constructional form shown in Figures 1 to 5 of the above mentioned drawings.

My electric heater consists of a series of tubes 1 (Fig. 1) duly interconnected by short tubes 2 forming a coil-like structure. Each of the said tubes 1 is provided with an internal concentric tube 3 of less diameter, so as to form an annular space 4 through which circulation of water or other liquid takes place.

Tube 3 is provided with an internal screw-like core of insulating material 5, on the threads of which the electric resistance 6 is wound. One of the ends of tube 1 has connected to it an inlet pipe 26 which is provided with a cock 7 by means of which the supply of water to the annular space 4 may be regulated, said cock being actuated by means of a handle 8 carrying an extension 9, by means of which the electric circuit may be closed or opened at the same time that the cock 7 is opened or closed to control the circulation of water through the electric heater (Figs. 3 and 4).

The front part of the apparatus is covered with a plate of insulating material 11, such as asbestos, through which the ends constituting positive poles of the resistances 6 are carried, such ends terminating in heads 12 duly connected by a wire 13, terminating on a copper contact plate 14. The opposite ends of the resistance 6 are connected to a wire 15 which extends to the negative pole 16 of the apparatus. The positive pole is shown at 17 and a wire 18 leads from the same to the copper contact plate 19.

The extension 9 of the handle 8 is curved at its free end and is provided with a copper contact plate 20 duly insulated from the said arm by means of a plate 21 of insulating material (Fig. 3). This curved part moves within an aperture 22 formed in the metallic outer cover 24 of the apparatus. 23 is a plate of insulating material and constitutes the neutral point. The whole is enveloped in a cylindrical metallic sheet 28 which is provided with brackets 27 (Fig. 5) which allow it to be fixed to the wall by means of screws 25.

The heat is produced by the passage of the electric current through the resistances, such heat being transmitted through the metallic walls of tube 3 to the water circulating in the annular space 4, the temperature of such water increasing on its passage through all the system of tubes 1 and coming out at 10 at the temperature required.

The supply-cock 7 is so arranged that when the arm 9 is on the left—that is, when the contact plate 20 of the said arm is on the neutral point 23, no access of water or electric current is permitted to the apparatus. When the handle 8 is moved in the direction of the arrow A, the extension 9 moves as per arrow B, the cock 7 opens and at the same time the contact plate 20 closes the electric circuit through the contacts 14 and 19.

The temperature to which the water may be heated can be graduated as follows. Instead of connecting all the resistances 6 to a single contact plate 14, a plurality of such plates, thus, for instance, may be used. To the first contact, a third part of the resistance 6 may be connected; to the second contact, two thirds of the resistance; and to the third contact, the whole resistance. A like number of plates 19 should be used. In this manner the gradual opening of the cock 7 corresponds to a higher resistance in the electric circuit.

In order to allow the use of higher amperages, and to diminish the sparks at the contacts and to consequently increase the life of the contacts, a relay may be introduced in series in the circuit, which device has been illustrated in Figure 6.

The relay is of the usual type and has a coil 30 with its core 31 and a lever 32 pivoted at one end at 33 and carrying at the other end a carbon contact point 34; the terminals of the coil being connected to binding screws 37 and 37' set into a support 29 of insulating material. A bar 35 is connected to the support 29 and carries at its free end a carbon point 36. The screw 37 is connected to the contact 14, which in its turn is connected by means of the handle 8—9 to the other contact 19, constituting the opposite pole of the external circuit. A wire 40 connects the contact 34 of the lever 32 to the screw 41, a resistance 38 being interposed between the binding screw 39 on rod 35 and the screw 37'. The relay is mounted in series with the circuit of the electric heater, of which four tubes have been diagrammatically shown.

The device works as follows. The handle 8 is operated until the circuits are closed between the contact plates 14 and 19 and as such handle also operates the water supply-cock, the water enters then to the tubes of the apparatus; on closing the circuit, the current flows through the coil 30 of the relay, the core 31 is energized and attracts the lever 32 whose contact 34 engages with the contact point 36 of the bar 35, which is connected with the opposite pole of the line through the screw 39. The circuit of the electric heater is thus closed and the current flows as follows: The pole 39 is a pole of the external circuit and is connected to bar 35 whose carbon contact end 36 engages with contact 34, which latter is connected at the same time by the wire 40 to the screw 41. From this screw 41 a wire 42 leads to one of the ends of the resistances 6 in the tubes 1, the other ends of said resistances being connected through the wire 43 with the other pole of the external circuit. One of the main advantages of the above device is that on interrupting the supply of water to the apparatus by closing the handle 8, the relay cuts off necessarily the circuit in the resistance 6, as with no current passing through the coil 30, its core 31 is de-energized, and sets free the lever 32, whereby the circuit is broken between contacts 34 and 36. This eliminates all danger of superheating of the tubes and consequent leaking at the welding edges.

The supply of electric current and water may also be obtained in a totally automatic manner, the actuation of the switch being effected by the pressure of the water within the tubes. In this manner the closure of the circuit will be impossible without a simultaneous supply of water to the tubes of the electric heater. A suitable device will now be described with special reference to Figures 7 and 8.

The switch is constituted by a tube 44 having its opposite ends internally screw-threaded, as indicated at 45 and 46. The water outlet tube is connected at 45 to tube 44, and at 46 another piece of tube 47 with thicker walls is fixed. Said tube 47 has at its upper end an enlargement 48, within which a thimble 49 is fixed,—said thimble having a flange 50 which bears against the stops 51 when the thimble is moved upward. The thimble has a series of lateral openings 52 and an upper aperture 53 to allow the passage of the water entering through tube 47. A bar 54 weighted at 55 bears continually on the top of the thimble 49 and passes through an aperture 56 in the wall of the tube 44, being fixed at its outer end to an axle 57 lodged within a case 58, which at the same time constitutes a cover for the aperture 56, its lateral walls being traversed by the axle 57, which may turn in orifices specially provided to that end, stuffing boxes 59 being formed to avoid leakage of water. The axle 57 is bent to form a parallelogram (Fig. 8) and has at the free end an extension 60 with a contact plate 61 insulated therefrom by means of a plate 62 of insulating material. The plates 19 and 14 form the terminals of the electric circuit in the apparatus. The water supply tube is screwed on the end 63 of the tube 47 and carries an ordinary cock.

On opening the cock the water enters tube 47 in the direction of the arrow A and presses against the thimble 49, which is raised against the action of the counter-weight 55 until the flange 50 strikes against the stops 51, the water passing through the orifices 52 and 53 to the tube 44 and thence to the tubes of the electric heater through the connection at 45. The orifice 53 allows further the escape of the air contained in the thimble. The thimble remains in the said position (Fig. 7), all the time that the cock is open, as the pressure against the upper face of said thimble, in the direction of the arrow A, is always greater than the loss of charge due to the escape of water through the orifices 52 and 53 added to the weight of the counterweight 55. In consequence, the thimble 49 on being raised will also raise the said counterweight 55, and the bar 54 will also move, turning the axle 57, whereby the contact plate 61 at the end of the extension 60 is moved to a position to close the electric circuit of the resistances 6 between the contact plates 19 and 14. The water enters then the apparatus and the electric circuits therefrom are closed. On closing the water supply cock, the water will no longer enter tube 47 and thereupon, the pressure at 49 having ceased, the counterweight 55 will cause the thimble 49 to descend until it rests on the flange 48, thereby breaking the electric circuit between contacts 19 and 14 in consequence of the disengagement of the contact plate 62. I obtain in this manner a simultaneous cut off of the supply of water and of the electric current.

Modifications and changes may obviously be made within the scope of the invention, as claimed.

What I claim is:

1. An electric heater, comprising a system of interconnected heating units each embodying an outer and an inner tube which are spaced from each other to provide an intermediate water-circulating passage, an externally-threaded core of insulating material in the inner tube, and a resistance wire coiled on the threads of said core; means for controlling the passage of an electric current to the resistance wires; and means for controlling the supply of water to the water passages.

2. An electric heater, comprising a system of interconnected heating units each embodying an outer and an inner tube which are spaced from each other to provide an intermediate water-circulating passage, an externally-threaded core of insulating material in the inner tube, and a resistance wire coiled on the threads of said core; an electric circuit wherein the resistance wires are included, having a pair of spaced contacts; a switch lever having a contact for bridging the first-named contacts to close said circuit; and means for controlling the supply of water to the water passages.

3. An electric heater, comprising a system of interconnected heating units each embodying an outer and an inner tube which are spaced from each other to provide an intermediate water-circulating passage, an externally-threaded core of insulating material in the inner tube, and a resistance wire coiled on the threads of said core; an electric circuit wherein the resistance wires are included, having a pair of spaced contacts; a relay in said circuit having an armature provided with a contact; a contact bar in said circuit engageable by the armature contact when the relay is energized; a switch lever having a contact for bridging the first-named contacts to close the circuit through the relay; and means for controlling the supply of water to the water passages.

In testimony whereof I affix my signature.

GERMAN ELIAS LOUBIÈRE.